United States Patent
Morgenstern

(12) 
(10) Patent No.: US 6,768,794 B1
(45) Date of Patent: Jul. 27, 2004

(54) TESTING BOX FOR A TELECOMMUNICATIONS SYSTEM

(75) Inventor: Todd A. Morgenstern, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 615 days.

(21) Appl. No.: 09/661,929

(22) Filed: Sep. 14, 2000

(51) Int. Cl.[7] .................. H04M 3/00; H04M 5/00; H04M 1/24; H04M 3/08; H04M 3/22
(52) U.S. Cl. ................... 379/325; 379/26.01
(58) Field of Search .............. 379/26.01, 21, 379/22, 27.01, 413.04, 325, 326, 327

(56) References Cited

U.S. PATENT DOCUMENTS

| | | | |
|---|---|---|---|
| 5,233,501 A | | 8/1993 | Allen et al. ............... 361/733 |
| 5,546,282 A | | 8/1996 | Hill et al. ................ 361/796 |
| 5,685,741 A | | 11/1997 | Dewey et al. ............ 439/668 |
| 5,793,909 A | * | 8/1998 | Leone et al. .............. 385/24 |
| 6,163,595 A | * | 12/2000 | Parker et al. ............. 379/22 |
| 6,201,853 B1 | * | 3/2001 | Butler et al. ............. 379/21 |
| 6,434,221 B1 | * | 8/2002 | Chong ................. 379/27.01 |
| 6,438,226 B1 | * | 8/2002 | Guenther et al. ...... 379/413.04 |
| 6,556,763 B1 | * | 4/2003 | Puetz et al. ............. 385/135 |

FOREIGN PATENT DOCUMENTS

EP    0 909 102 A2    4/1999

OTHER PUBLICATIONS

Exhibit 1 is a photograph of a test access box that is believed to be prior art with respect to present application.

* cited by examiner

Primary Examiner—Benny Tieu
(74) Attorney, Agent, or Firm—Merchant & Gould P.C.

(57) ABSTRACT

A test box including a housing defining a front plane and a back plane. A plurality of jacks are positioned adjacent the front plane. The jacks define a plurality of rows of ports. Each row of ports includes at least 24 ports. The jacks also include electrical contacts corresponding to each of the ports. The testing box also includes a plurality of pairs of electrical connectors positioned adjacent the back plane. Each pair of electrical connectors includes an input connector for inputting signals into the test box and an output connector for outputting signals from the test box. The test box further includes a plurality of circuit boards positioned within the housing. The circuit boards include tracings for conveying signals from the input connectors to the jacks and for returning the signals from the jacks back to the output connectors.

6 Claims, 21 Drawing Sheets

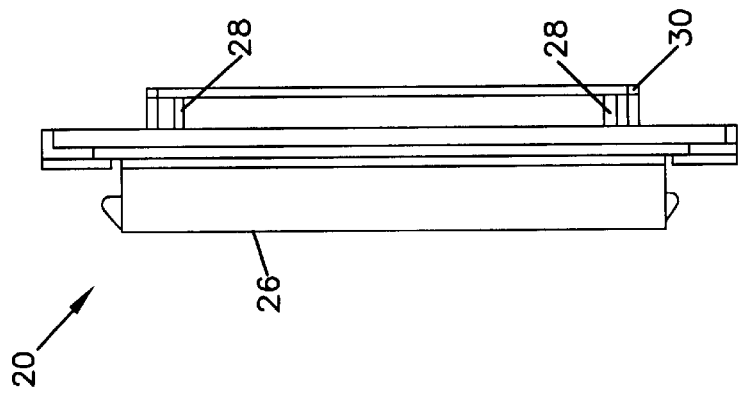
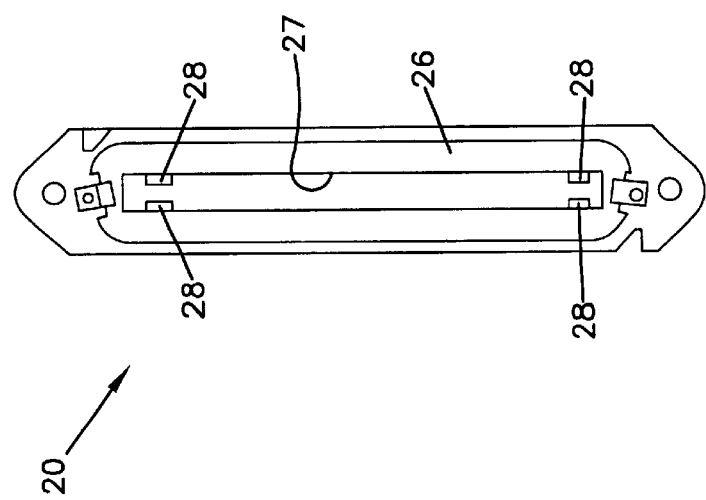

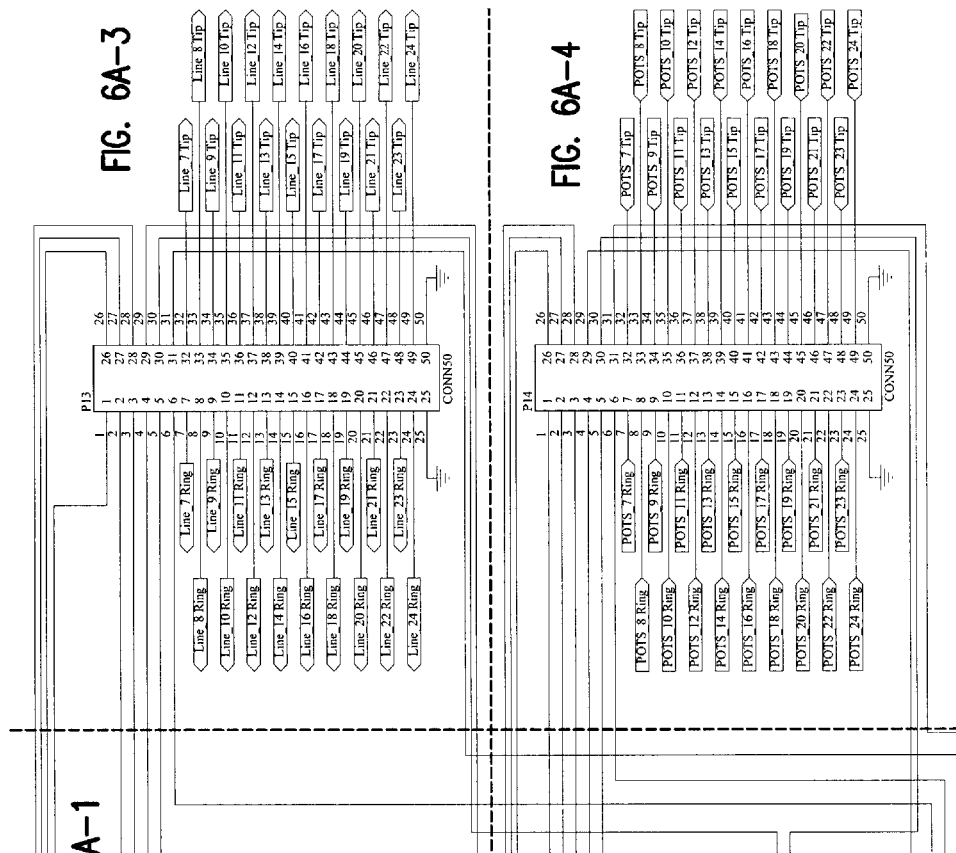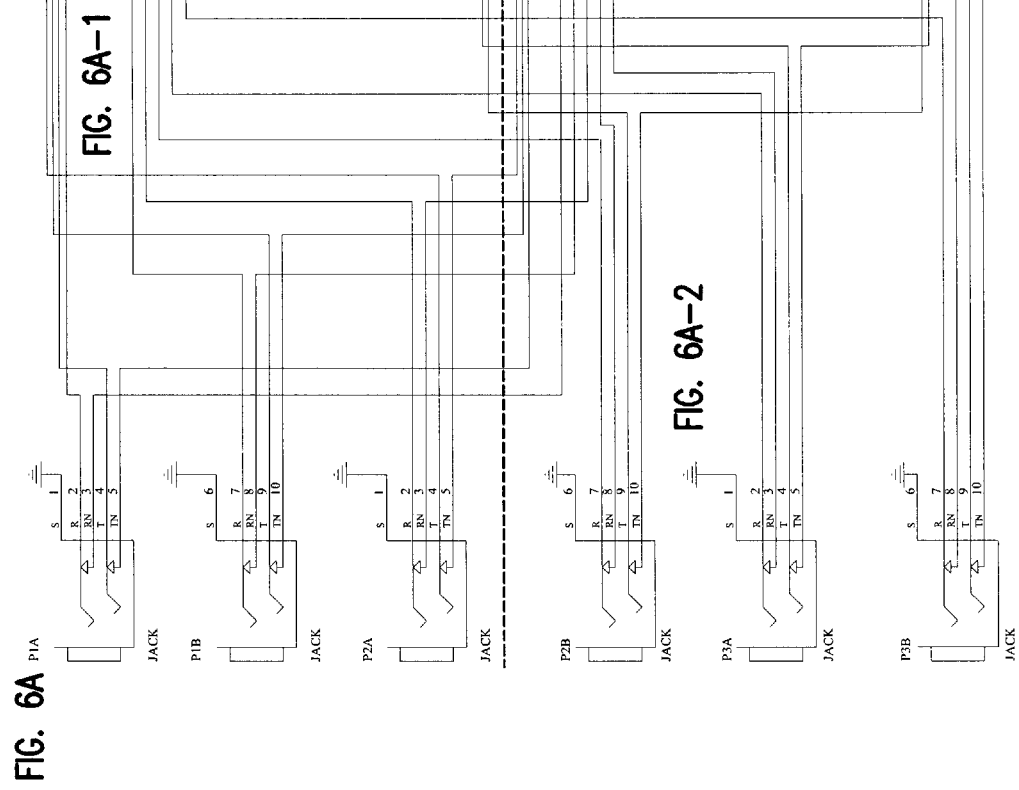

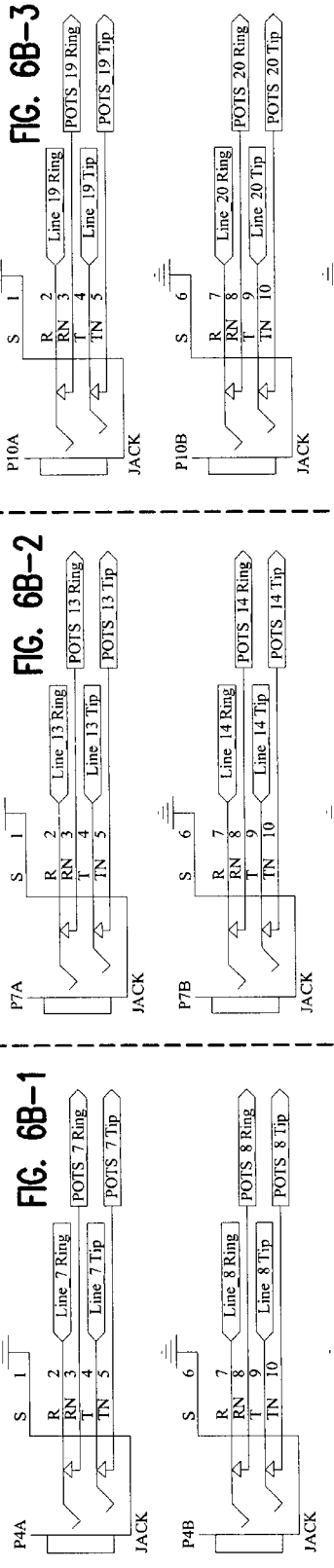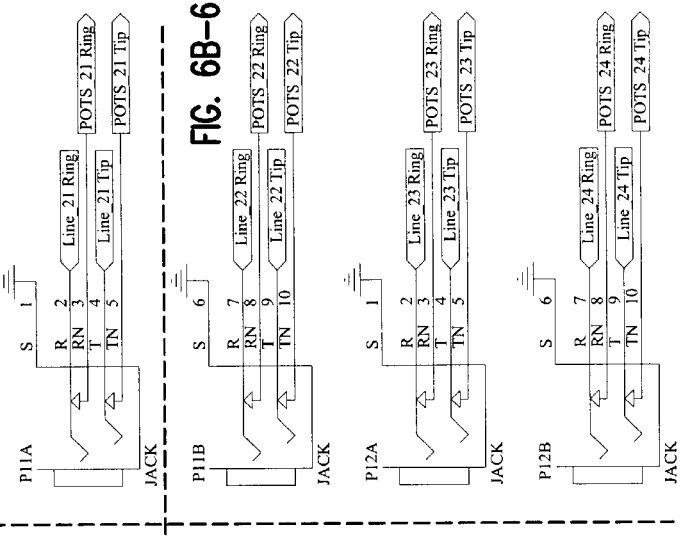

TESTING BOX FOR A TELECOMMUNICATIONS SYSTEM

FIELD OF THE INVENTION

The present invention relates generally to telecommunications equipment. More particularly, the present invention relates to telecommunications equipment for use in twisted pair telephone carrier systems.

BACKGROUND OF THE INVENTION

Telecommunications systems commonly include cables containing bundles of conductor pairs for transmitting telecommunications signals (e.g., voice only signals, data only signals, and combined/mixed voice and data signals, etc.). In these systems, mating connectors (e.g., 25 pair Telco or Amp connectors) are used to couple the cables to telecommunications equipment for processing. In a twisted pair telephone carrier system servicing residential and/or businesses, the system may include an MDF (Main Distribution Frame), a POTS (Plain Old Telephone Service) splitter for separating voice and data signals, and a DSLAM (Digital Subscriber Line Access Multi-Plexer). For most systems, it is desirable to maximize the densities of the component parts. It is also desirable to be able to easily test the telecommunications lines of the system to identify errors.

SUMMARY OF THE INVENTION

One aspect of the present invention relates to a telecommunications component including a circuit board having a first end and a second end. One or more jacks are connected to the circuit board adjacent the first end. The one or more jacks define at least 24 ports for receiving tip-and-ring plugs. The one or more jacks also include electrical contacts corresponding to each of the ports. An input connector is positioned adjacent the second end of the circuit board, and an output connector is also positioned adjacent the second end of the circuit board. Tracings are also provided for electrically connecting the input and output connectors to the electrical contacts.

Another aspect of the present invention relates to a test box including a housing defining a front plane and a back plane. A plurality of jacks are positioned adjacent the front plane. The jacks define a plurality of rows of ports. Each row of ports includes at least 24 ports. The jacks also include electrical contacts corresponding to each of the ports. The testing box also includes a plurality of pairs of electrical connectors positioned adjacent the back plane. Each pair of electrical connectors includes an input connector for inputting signals into the test box and an output connector for outputting signals from the test box. The test box further includes a plurality of circuit boards positioned within the housing. The circuit boards include tracings for conveying signals from the input connectors to the jacks and for returning the signals from the jacks back to the output connectors.

A further aspect of the present invention relates to a telecommunications system including a main distribution frame, a splitter device, and a test box positioned between the main distribution frame and the splitter device. The test box includes input and output connectors. The test box also includes jacks defining ports for accessing (e.g., with a tip-and-ring plug) mixed voice and data signals passed through the test box. The test box further includes circuit boards for passing the signals from the input connectors to the jacks, and for passing the signals from the jacks to the output connectors. First cables are provided for outputting the signals from the main distribution frame to the input connectors of the test box, and second cables are provided for outputting the signals from the test box to the splitter device.

BRIEF DESCRIPTION OF THE DRAWINGS

FIGS. 3A and 3B are front and side views of an exemplary twenty-five pair cable connector;

Figure 1:
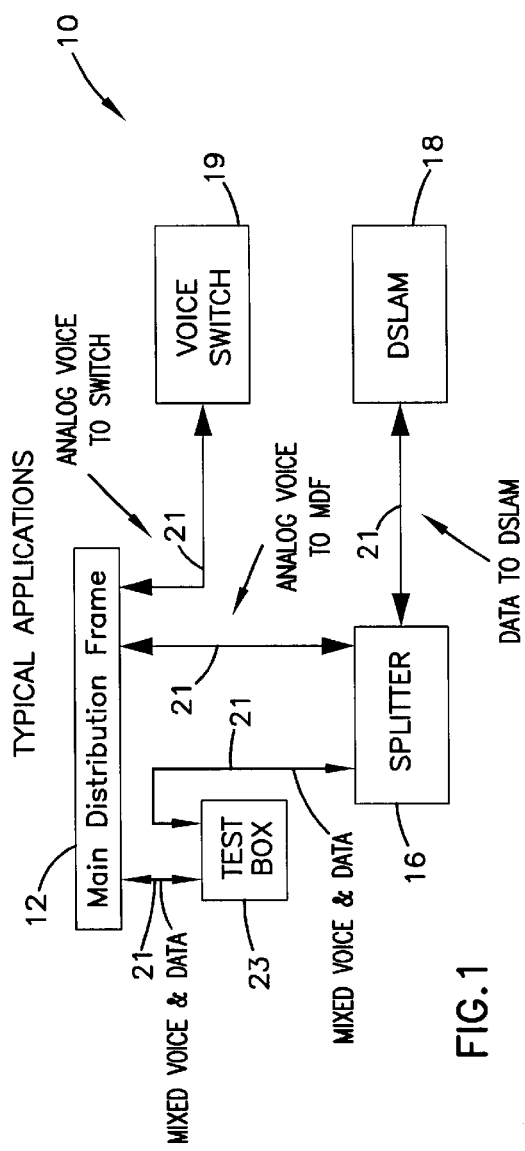
FIG. 1 is a diagram of a telecommunications system including an MDF, a splitter device, a DSLAM, a testing box, and a voice switch.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention.

Referring now to FIG. 1, a telecommunications system 10 is shown including an arrangement of telecommunications equipment. The system 10 is representative of a telephone carrier's system for transmitting voice and data to residences and businesses. A main distribution frame (MDF) 12 is linked to a splitter device 16 (e.g., a card including POTS splitter circuits or ISDN (Integrated Services Digital Network) splitter circuits). The MDF 12 is also linked to one or more DSLAM modules 18, and a voice switch 19 (e.g., a switch equipped with POTS interface line cards or ISDN interface line cards). A test box 23 is positioned between the MDF 12 and the splitter device 16.

In use of the system 10, the splitter device 16 receives a mixed voice and data signal from the MDF 12. In traveling from the MDF 12 to the splitter device 16, the mixed voice and data signal passes through the test box 23. The splitter device 16 splits the mixed signal into split signals, and then filters the split signals. For example, one of the split signals can be filtered to provide a voice only signal (i.e., the high frequency data portion of the signal is filtered out), while the other split signal can be filtered to provide a data only signal (i.e., the low frequency voice portion of the signal is filtered out). The data only signals are passed from the splitter device 16 to the DSLAM 18. The voice only signals are passed from the splitter device 16 to the MDF 12 for transmission to the voice switch 19. The test box 23 allows a service technician to readily test (e.g., either intrusively or non-intrusively) the mixed data and voice signals passing between the MDF 12 and the splitter device 16. In alternative embodiments, the test box 23 can be positioned along the data only or voice only lines to allow such lines to be readily tested. Further, although the signal paths have been shown in FIG. 1 going in one direction, the system is bi-directional.

Figure 2:
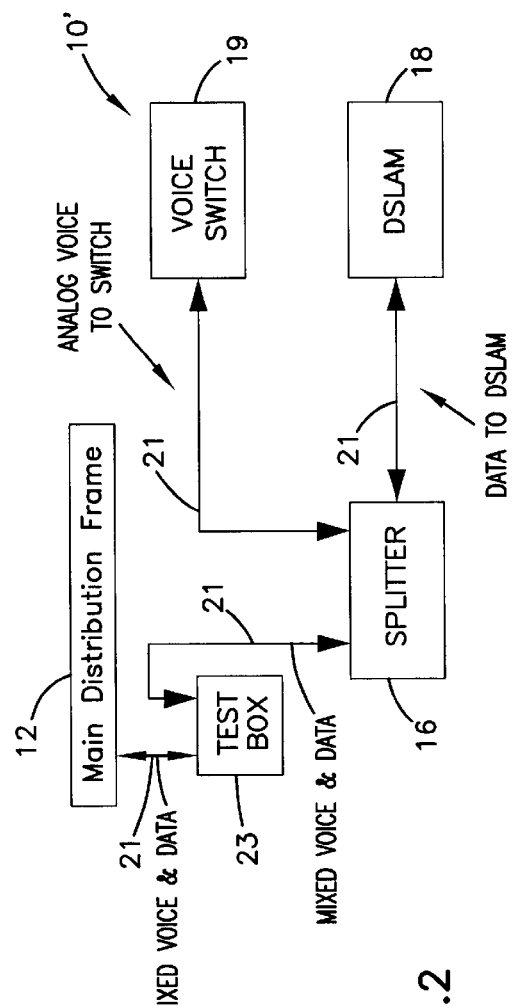
FIG. 2 is another telecommunications system including an MDF, a splitter device, a DSLAM, a testing box, and a voice switch.

FIG. 2 shows a similar telecommunications system 10' having the same components as those described with respect to the telecommunications system 10' of FIG. 1. However, in the embodiment of FIG. 2, voice signals are transmitted directly from the splitter device 16 to the voice switch 19.

Referring still to FIGS. 1 and 2, the MDF 12, the POTS splitter device 16, the DSLAM 18, the test box 23 and the voice switch 19 are typically interconnected by cables 21. The cables 21 preferably each include multiple pairs of conductors for transmitting separate twisted pair signals. By way of example, the cables 21 can comprise 25 pair cables (i.e., cables each containing 25 pairs of wire conductors for transmitting 25 separate twisted pair signals). Multi-pair connectors are used to provide interconnections between the cables 21 and the components of the telecommunications system 10. For example, multi-pair connectors are typically provided at the ends of the cables 21. The multi-pair connectors at the ends of the cables 21 are commonly coupled to corresponding multi-pair cable connectors mounted at the equipment to provide connections therebetween.

Figures 1, 6A:
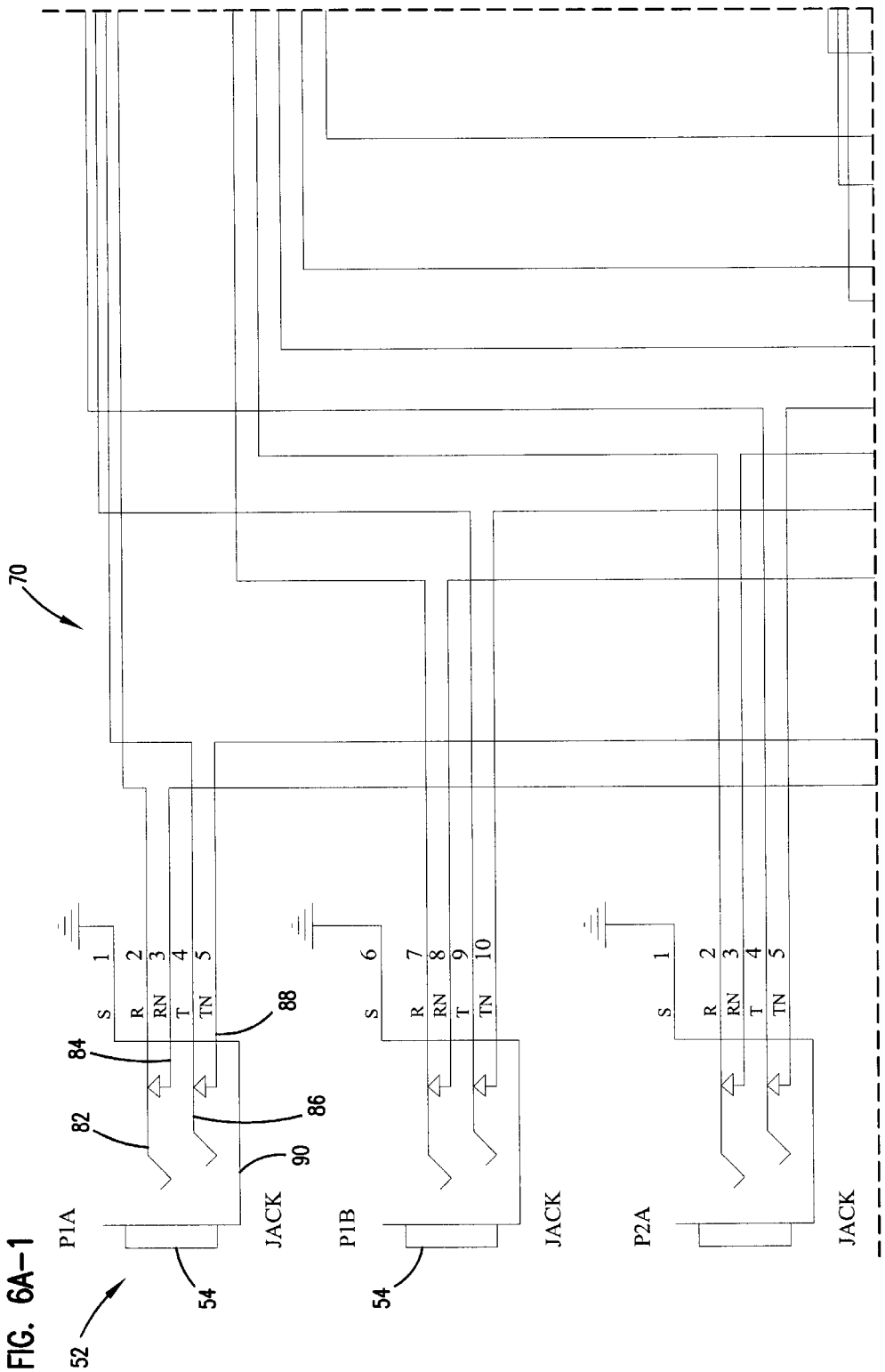
FIGS. 6A and 6B show a schematic tracing lay-out for the test access board of FIG. 5A.
Figures 2, 6A:
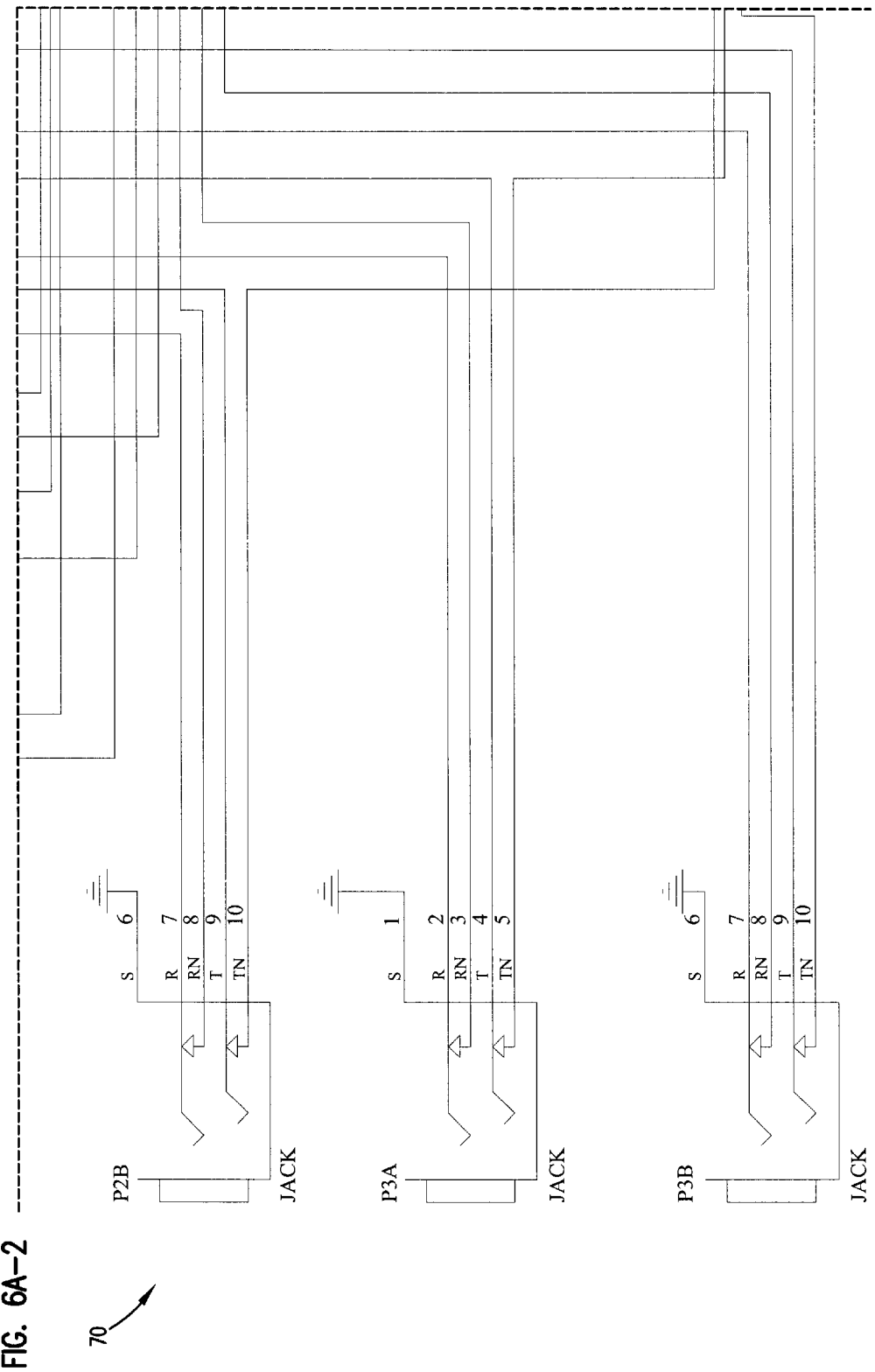
Figures 3, 6A:
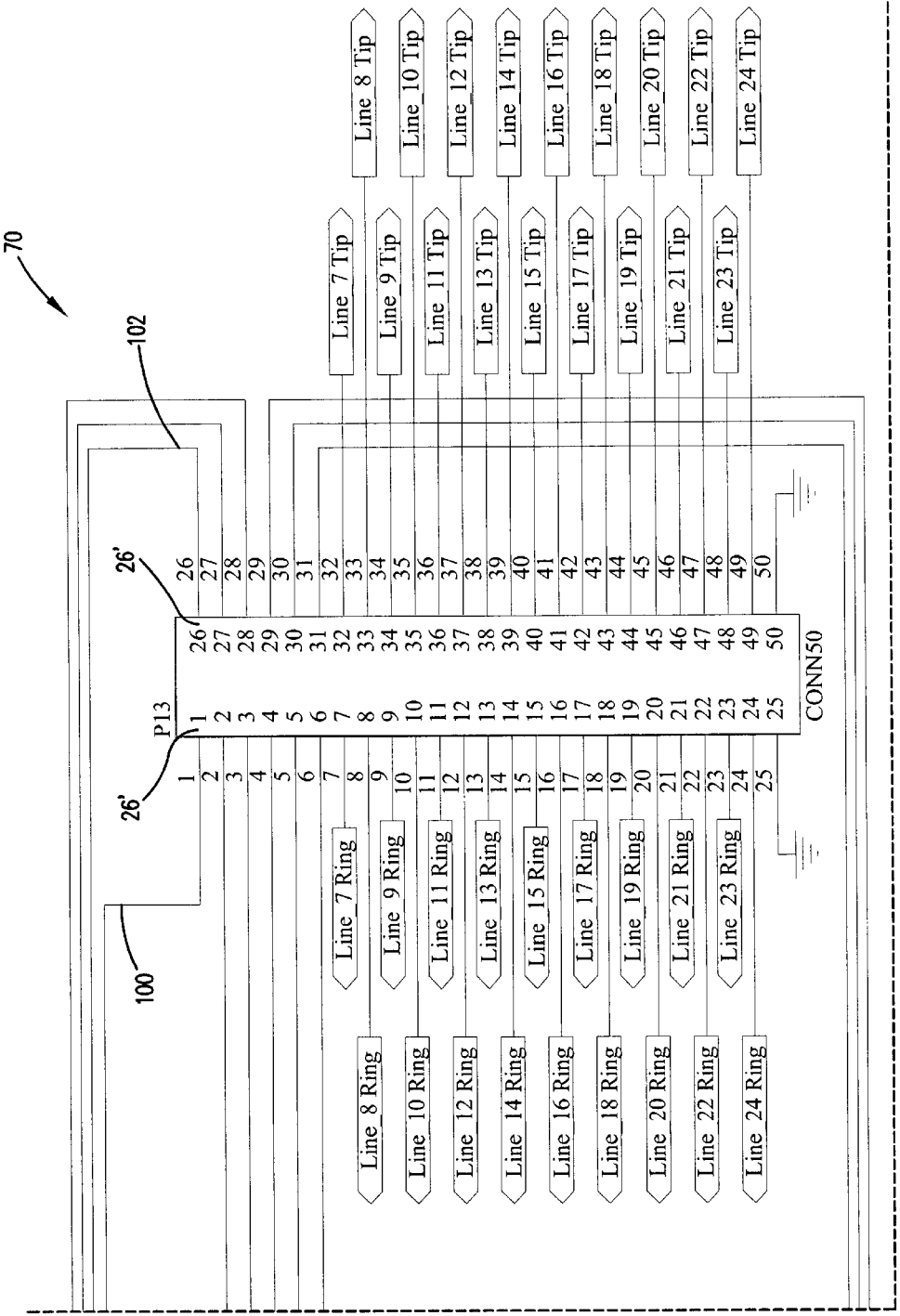
Figures 4, 6A:
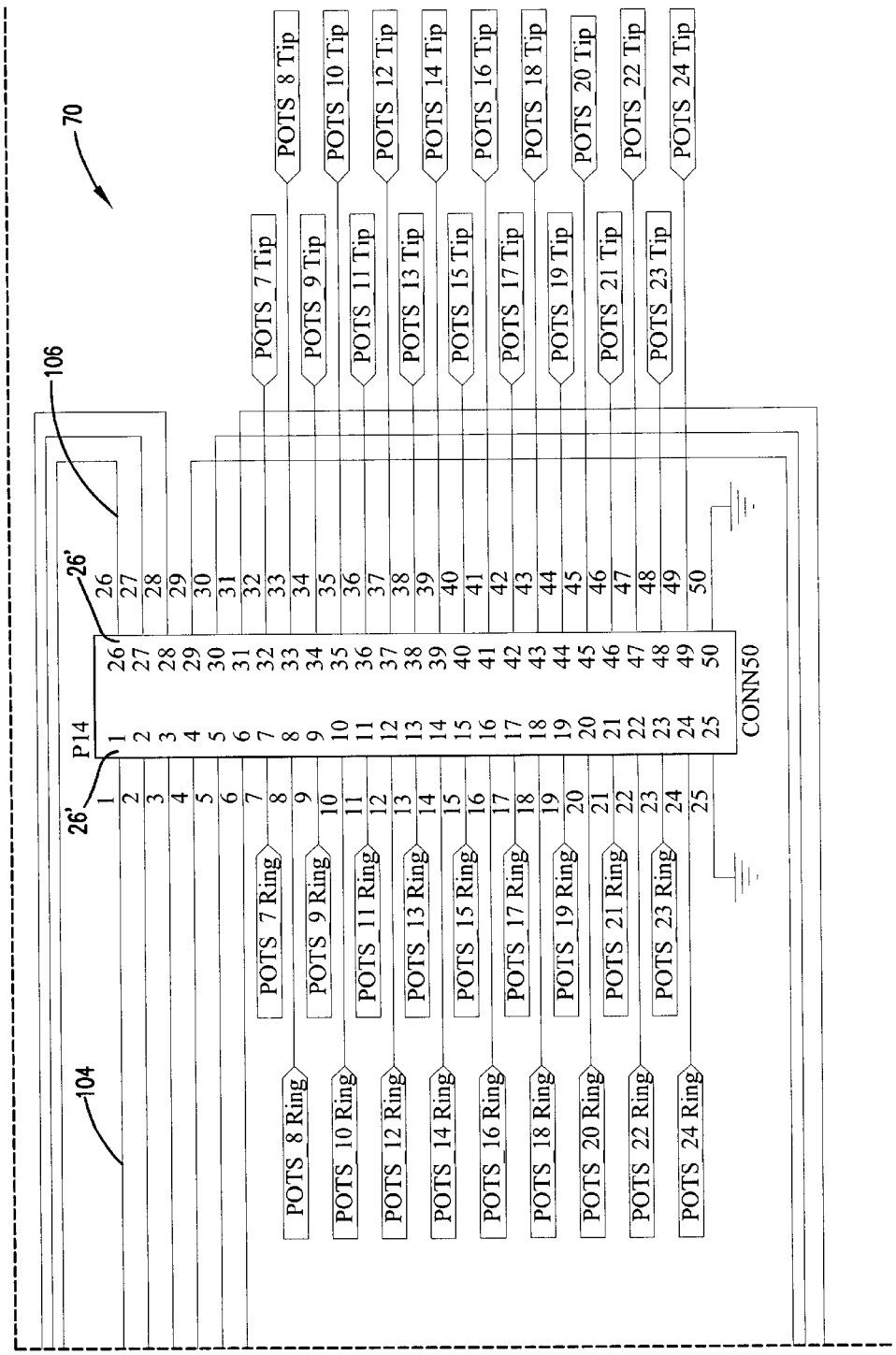

An exemplary multi-pair cable connector 20 is shown in FIGS. 3A and 3B. The depicted connector 20 is a conventional connector such as a Telco or Amp connector. Preferably, the connector 20 is adapted for use with a 25 pair cable. Thus, the connector 20 preferably includes 25 pairs of conductors 28. For clarity, only two of the pairs of conductors 28 are shown in FIGS. 3A and 3B.

The connector 20 includes a first end 26 defining a receptacle 27 sized for receiving a portion of a mating connector (not shown) connected at the end of a cable. The pairs of conductors 28 are positioned within the receptacle 27, and are adapted to contact corresponding conductor pairs of the mating connector. The conductors 28 extend through the connector 20 from the first end 26 to a second end 30. Portions of the conductors 28 located at the second end 30 are used to provide connections to conductor pairs of cables, wires, circuit boards, equipment, etc.

Figure 4A:
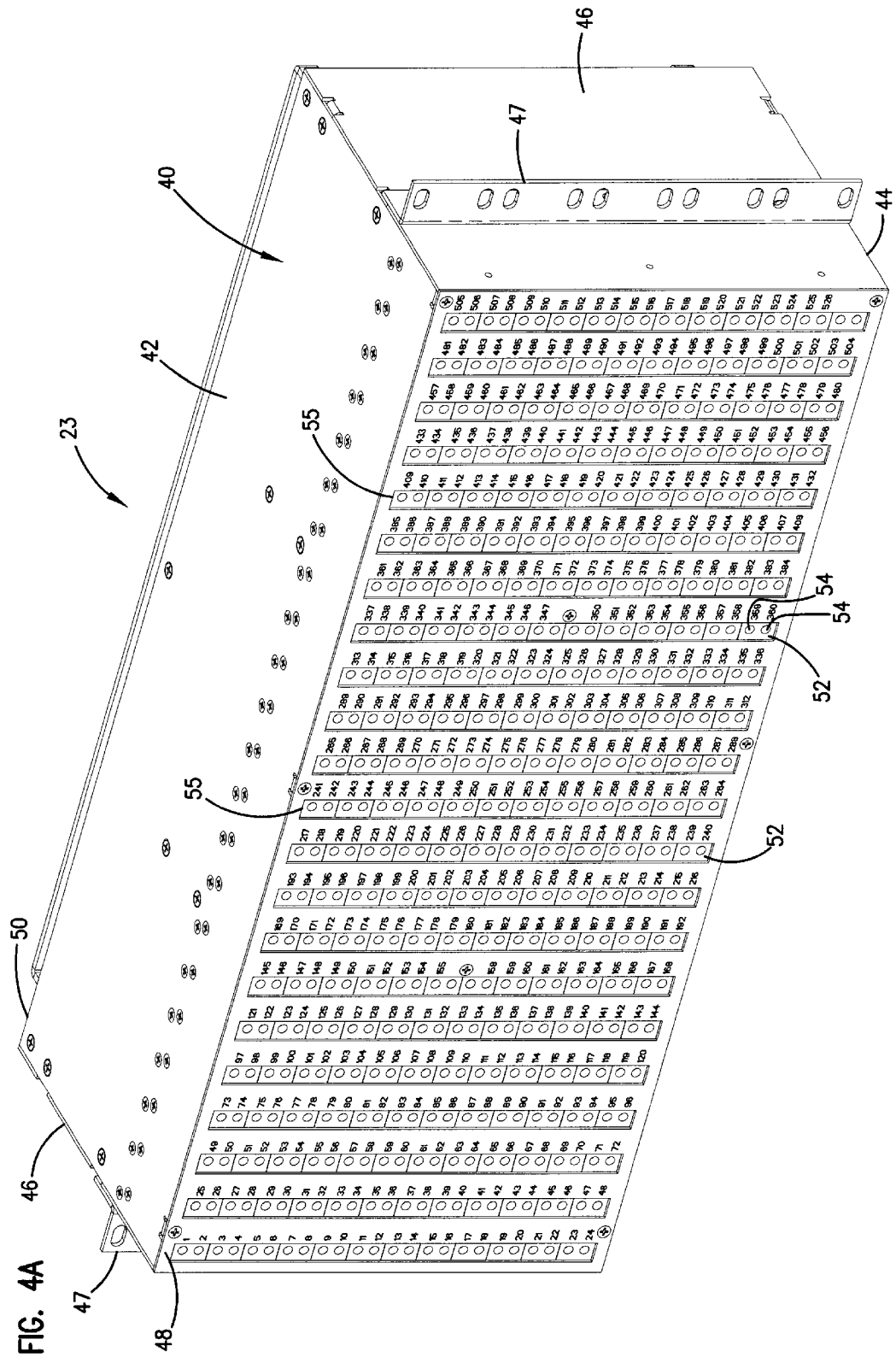
FIG. 4A is a front, perspective view of a test box constructed in accordance with the principles of the present invention.
Figure 4B:
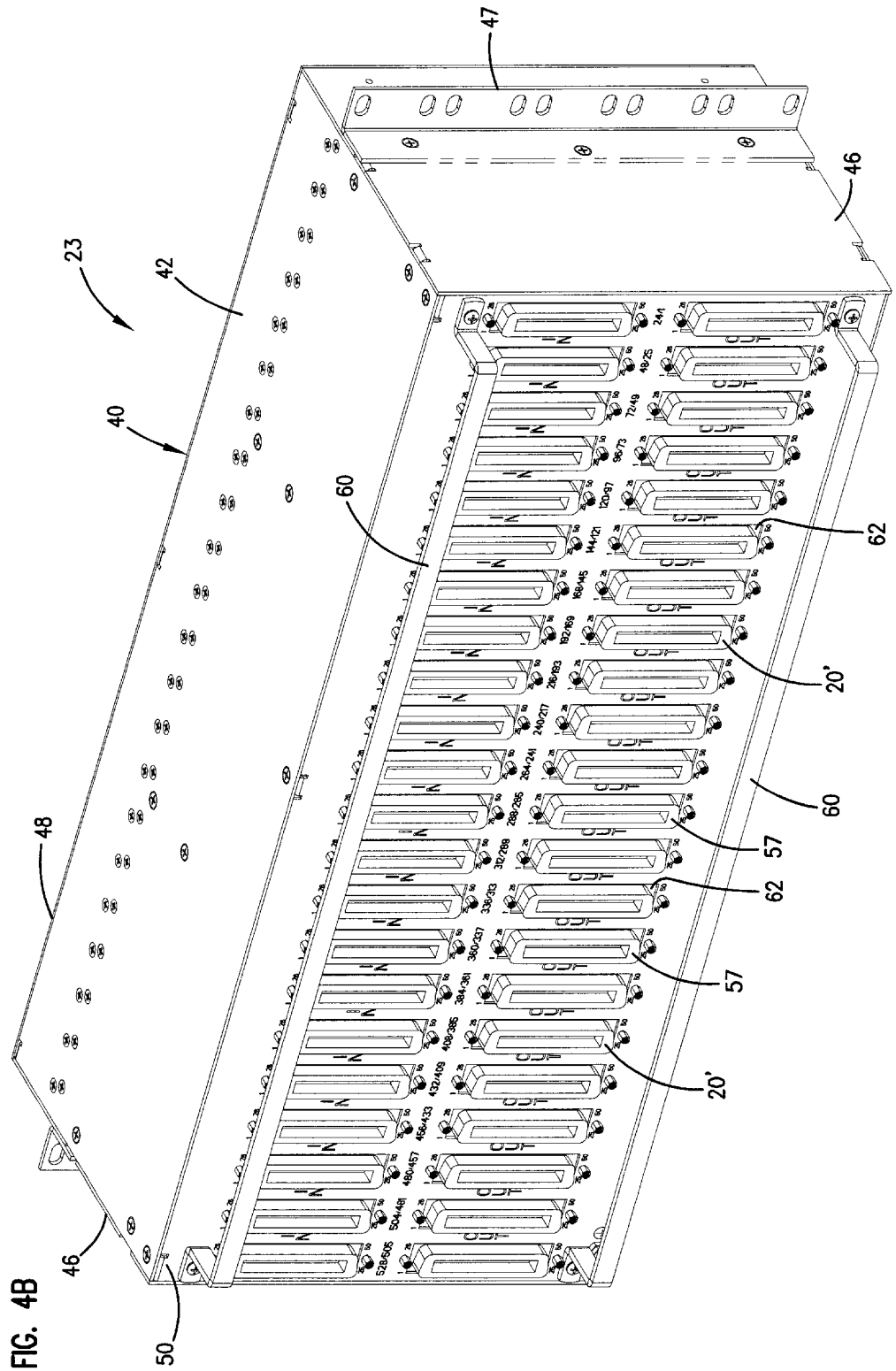
FIG. 4B is a rear, perspective view of the test box of FIG. 4A.

FIGS. 4A and 4B illustrate one embodiment of the test box 23 that is constructed in accordance with the principles of the present invention. The test box 23 includes a generally rectangular housing 40 having a top wall 42 spaced from an bottom wall 44, and two side walls 46 that extend between the top and bottom walls 42 and 44. The housing 40 also includes a front panel 48 defining a front plane of the test box 23, and a rear panel 50 defining a back plane of the test box 23. The front and rear panels 48 and 50 are preferably removably connected to the top and bottom walls 42 and 44 by conventional techniques (e.g., fasteners such as bolts or screws). The side walls 46 include side flanges or brackets 47 for allowing the test box 23 to be readily mounted on a rack (e.g., a 23 inch wide rack)

Referring to FIG. 4A, a plurality of normally-through jacks 52 are mounted at the front plane of the test box 23. Each of the jacks 52 defines two ports 54. Each of the ports 54 is sized for receiving a tip-and-ring plug 56 as shown in FIG. 5C. The ports 54 are arranged so as to define an array having a plurality of vertical columns. The front panel 48 defines a vertical slot 55 corresponding to each of the columns for providing access to the ports 54. Preferably, each column includes at least 24 ports. Also, in a preferred embodiment, the front plane includes a total of at least 528 ports.

Referring to FIG. 4B, a plurality of multi-pair cable connectors 20' are mounted at the back plane of the test box 23. Preferably, the cable connectors 20' are 25 pair connectors adapted for use with 25 pair cables. The connectors 20' are arranged so as to define two vertically spaced-apart, horizontal rows. The connectors 20' include pairs of vertically spaced-apart IN and OUT connectors. As shown in FIG. 4B, the IN connectors form the upper row of connectors, and the OUT connectors form the lower row of connectors. Preferably, each pair of vertically spaced-apart IN and OUT connectors corresponds to one of the vertical columns of ports 54 located at the front plane of the test box 23.

Still referring to FIG. 4B, the rear panel 50 defines a plurality of rectangular openings 62 for allowing access to the connectors 20'. For example, the openings 62 allow receptacle portions 57 (i.e., the portions of the connectors 20' that define receptacles for receiving mating connectors connected at the ends of cables) of the connectors 20' to project outwardly from the back plane. Preferably, the test box 23 includes at least forty-four 25 pair cable connectors. Top and bottom tie-down brackets 60 are connected to the rear panel 50 for enhancing cable management.

Circuit boards are preferably provided in the housing 40 for electrically connecting each column of normally-through jacks 52 to its corresponding pair of IN- and OUT connectors 20'. As mounted within the housing 40, the circuit boards are preferably aligned along vertical planes and are arranged in parallel, spaced-apart relation relative to one another. The circuit boards assist in maximizing the density of the test box 23.

Figure 5A:
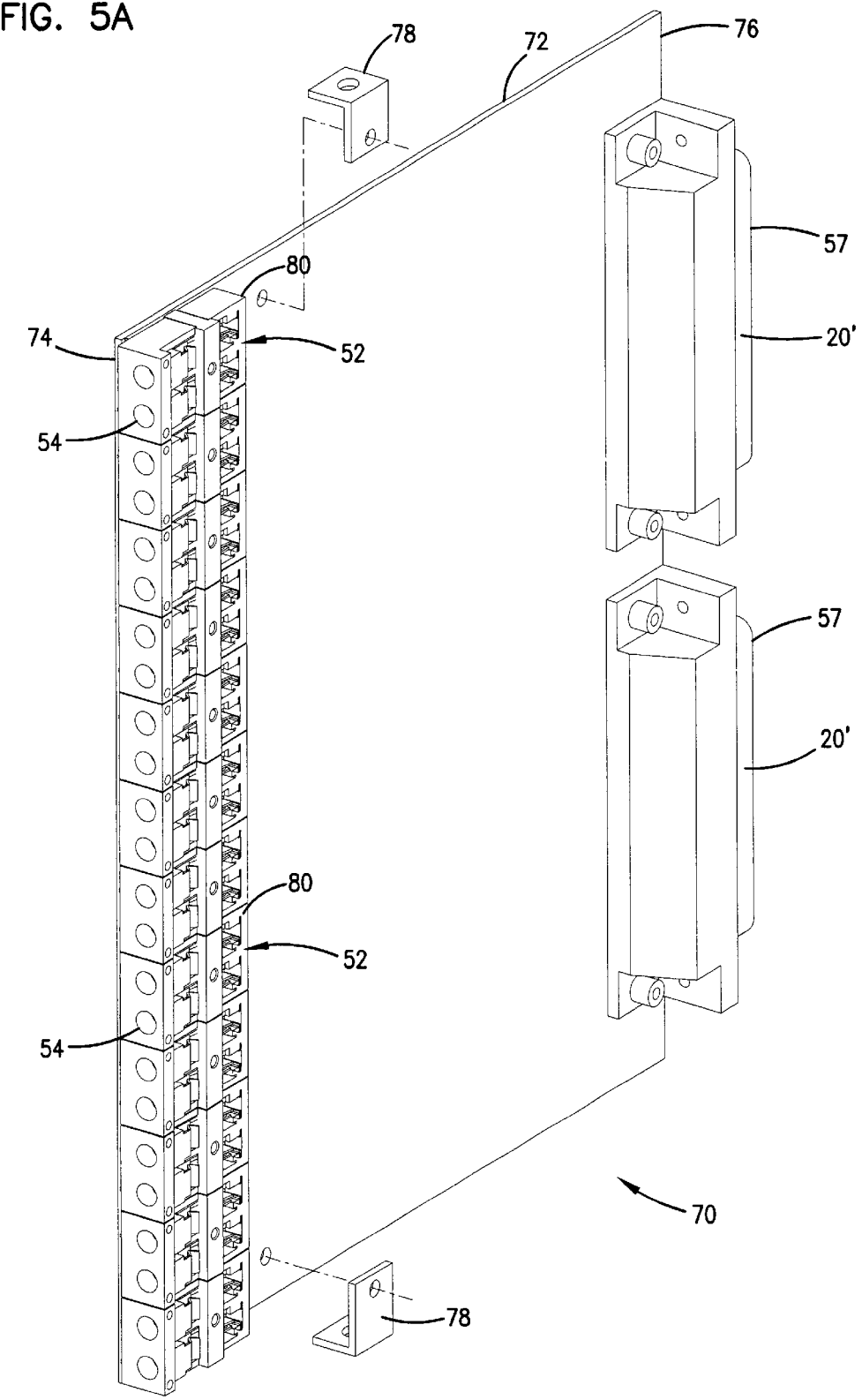
FIG. 5A is a front, perspective view of a test access board constructed in accordance with the principles of the present invention.
Figure 5B:
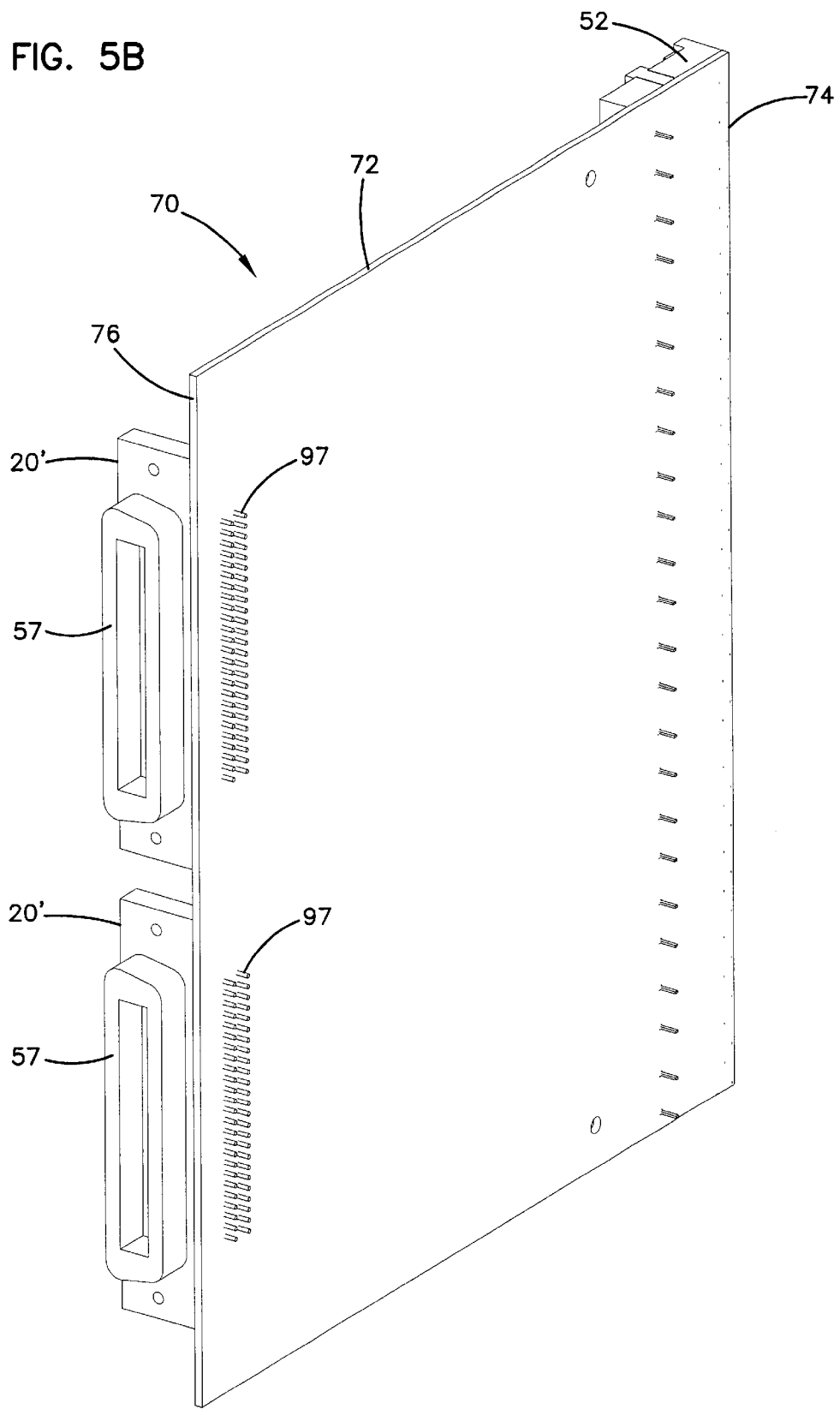
FIG. 5B is a rear, perspective view of the test access board of FIG. 5A.
Figure 5C:
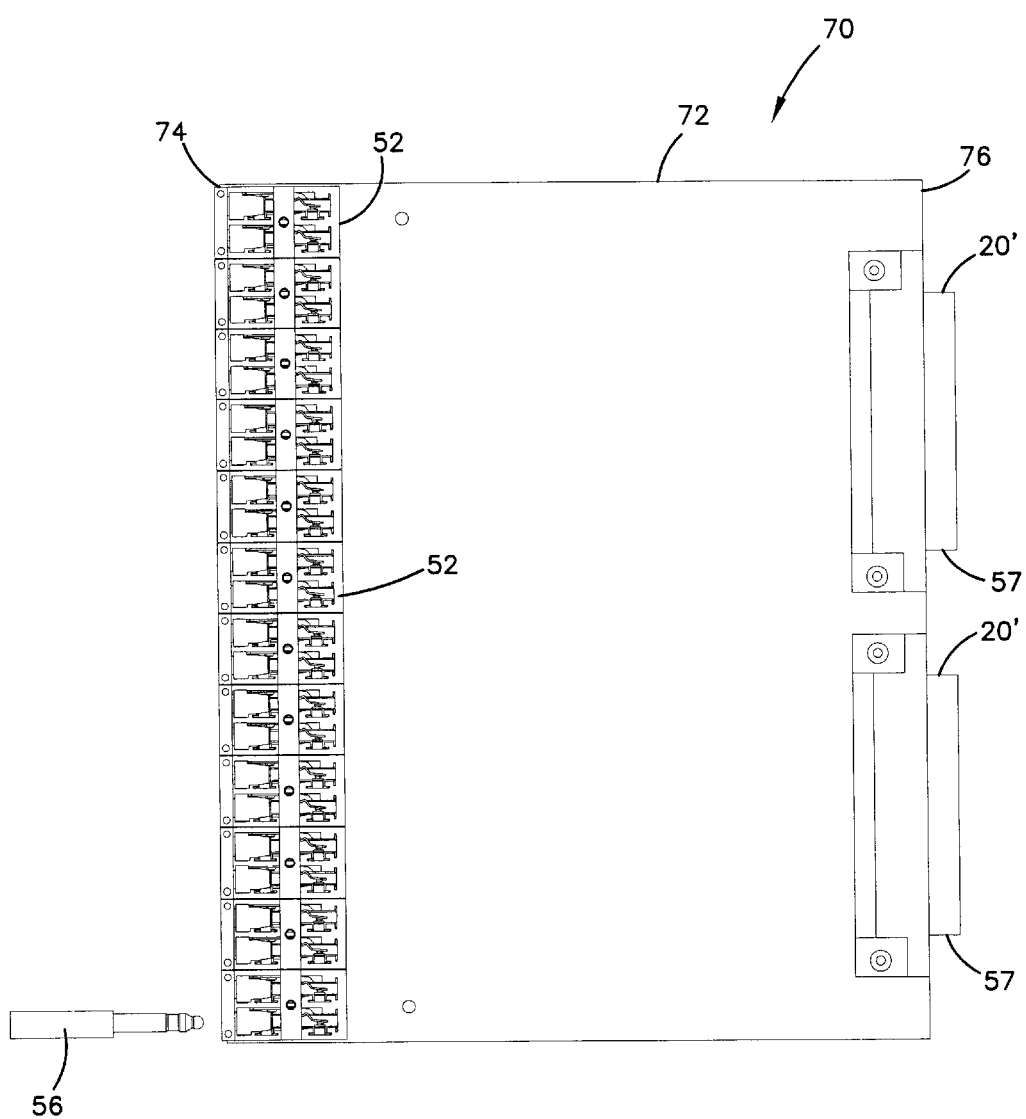
FIG. 5C is a side, elevational view of the test access board of FIG. 5A.
Figure 5D:
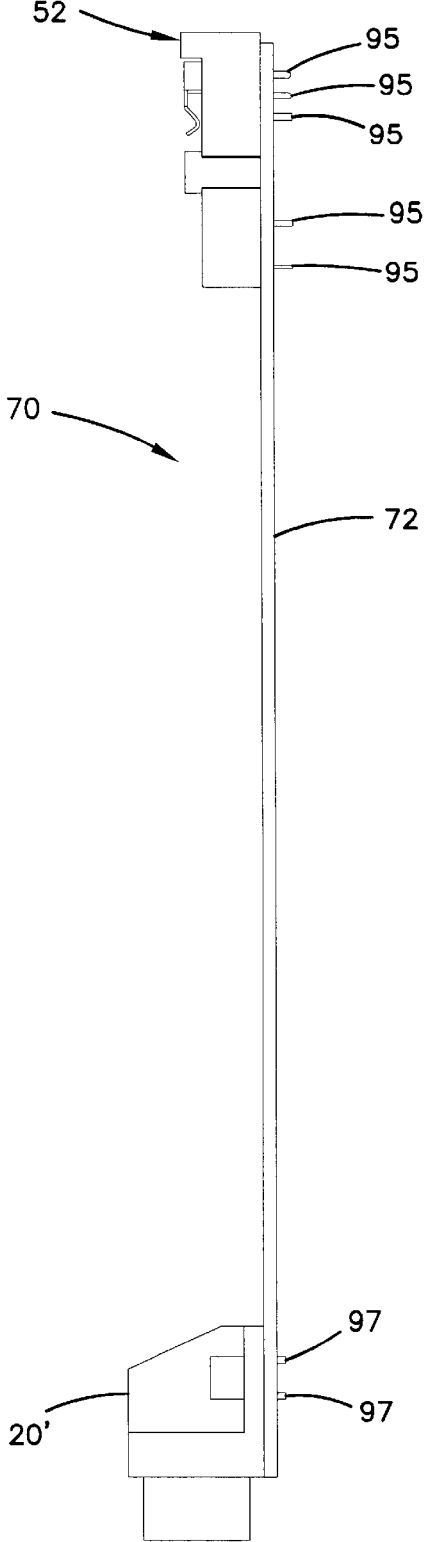
FIG. 5D is a top view of the test access board of FIG. 5A.

FIGS. 5A–5D show an example of a test access board 70 constructed in accordance with the principles of the present invention. The test access board 70 includes a circuit board 72 having a front end 74 positioned opposite from a rear end 76. When the test access board 70 mounted in the housing 40, the front end 74 is positioned adjacent the front plane of the test box 23, and the rear end 76 is positioned adjacent the back plane of the test box 23. Any number of techniques can secure the test access board 70 to the housing 40. As shown in FIG. 5A, the test access board 70 is preferably secured to the housing by L-shaped brackets 78 which are connected to the board (e.g., by conventional fasteners) and are also connected to the top and bottom walls 42 and 44 of the housing 40 (e.g., by conventional fasteners).

Referring to FIG. 5A, a plurality of the jacks 52 are mounted to the circuit board 72 adjacent the front end 74. The ports 54 of the jacks 52 are aligned along a common line or plane. Each jack 52 includes a dielectric housing 80 that defines two of the ports 54. A plurality of electrical contacts (e.g., springs or other contacts) are mounted within each jack housing 80. For example, referring to FIG. 6A, for each of the ports 54 each jack includes a ring spring 82, a ring normal contact 84, a tip spring 86, a tip normal contact 88, and a sleeve contact 90. The sleeve contacts 90 are preferably connected to ground. Since the jacks 52 are normally-through jacks, the tip springs 86 normally engage the tip normal contacts 88, and the ring springs 82 normally engage the ring normal contacts 84. Thus, when no plug is inserted within a port 54, signals will pass from the springs 82, 86 to their respective normal contacts 84, 88. By contrast, when a tip-and-ring plug is inserted within one of the ports 54, the springs 82, 86 corresponding to the port 54 will be disengaged from their respective contacts 84, 88 thereby preventing the signal from passing through the jack. Instead, the signal is passed through the plug (e.g., for testing purposes).

As best shown in FIG. 5A, all of the jacks 52 are mounted on a common side of the circuit board 72. Thus, all of the ports 54 are also positioned on one side of the circuit board 72. The jacks 52 are electrically connected to the circuit board 72 by pins 95 (best shown in FIG. 5D) that fit within plated through-holes formed within the circuit board 72. Separate pins 95 are electrically connected to each of the springs 82, 86 and the contacts 84, 88 and 90 of the jacks 52. The pins 95 preferably project outwardly from the sides of the jack housings 80 that face the circuit board 72. While multiple jacks 52 are shown mounted to the circuit board 72 in the embodiment of FIGS. 5A–5D, it will be appreciated that a single jack housing defining all of the ports and holding all of the contacts could also be used.

Referring again to FIGS. 5A–5D, the test access board 70 includes a pair of IN and OUT connectors 20' mounted to the circuit board 72 adjacent the rear end 76 of the circuit board 72. In one embodiment, the connectors 20' are conventional connectors such as a Telco or Amp connectors. Similar to the connector shown at FIGS. 3A and 3B, the connectors 20' are preferably adapted for use with 25 pair cables and preferably includes 25 pairs of conductors 26' (shown schematically in FIG. 6A) positioned within the receptacle portions 57 of each connector 20'. The connectors 20' are electrically connected to the circuit board 72 by pins 97 (best shown in FIG. 5D) that fit within plated through-holes formed within the circuit board 72. Separate pins 97 are electrically connected to each of the conductors 26'. The pins 97 preferably project outwardly from the sides of the connector housings that face the circuit board 72. While the above-described connectors are preferred, other connectors such as card edge connectors, wire wrap member, etc. could also be used.

Figures 1, 6B:
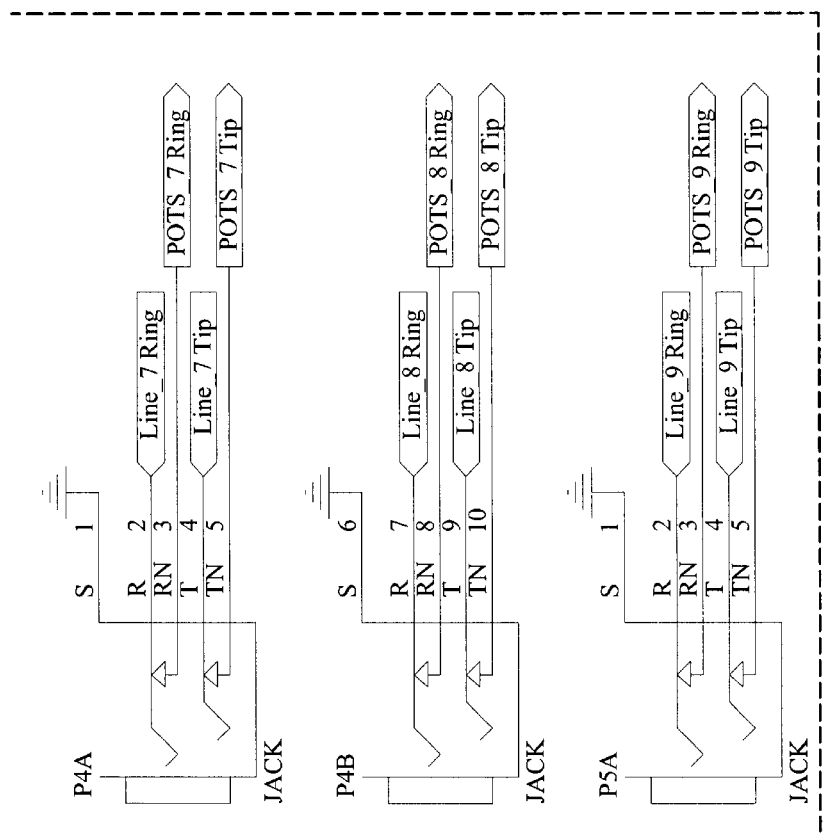
Figures 2, 6B:
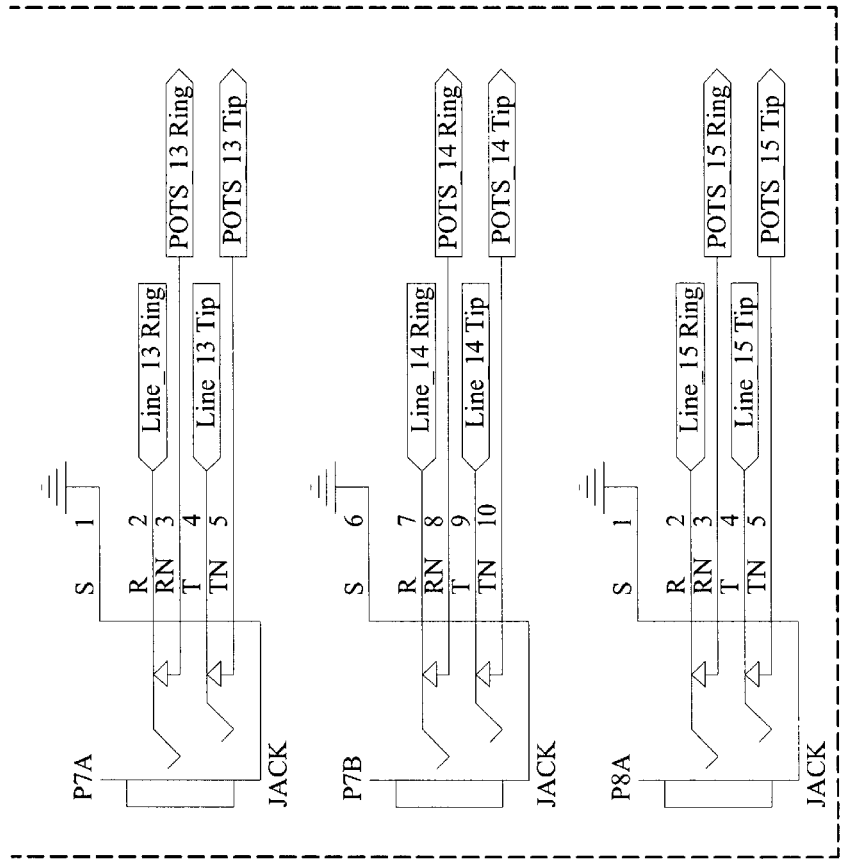
Figures 3, 6B:
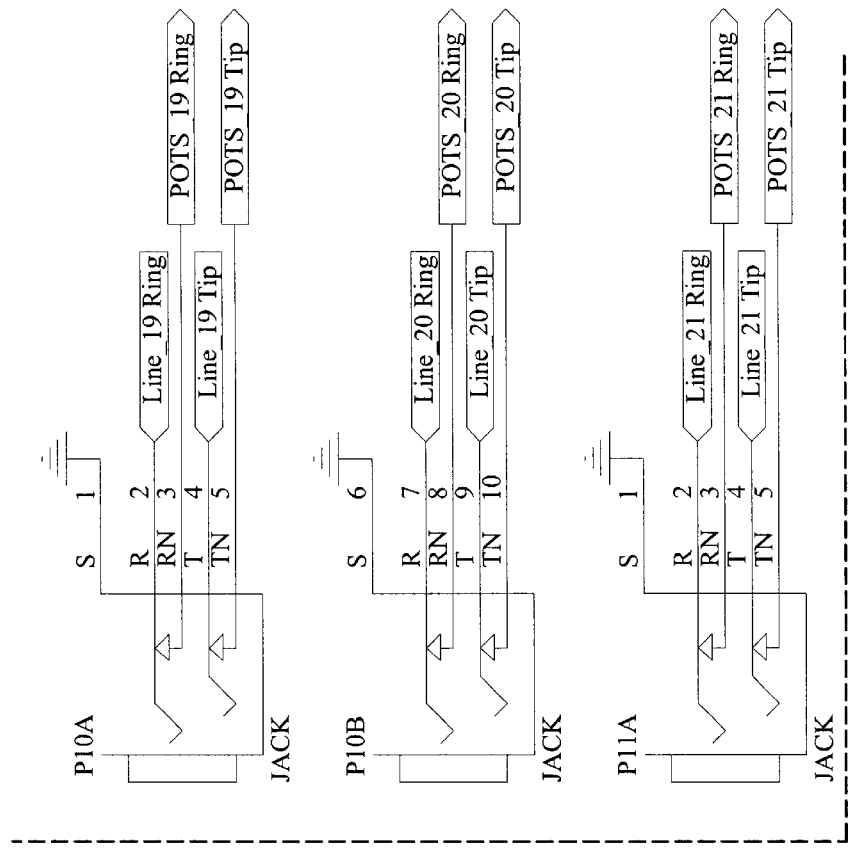
Figures 4, 6B:
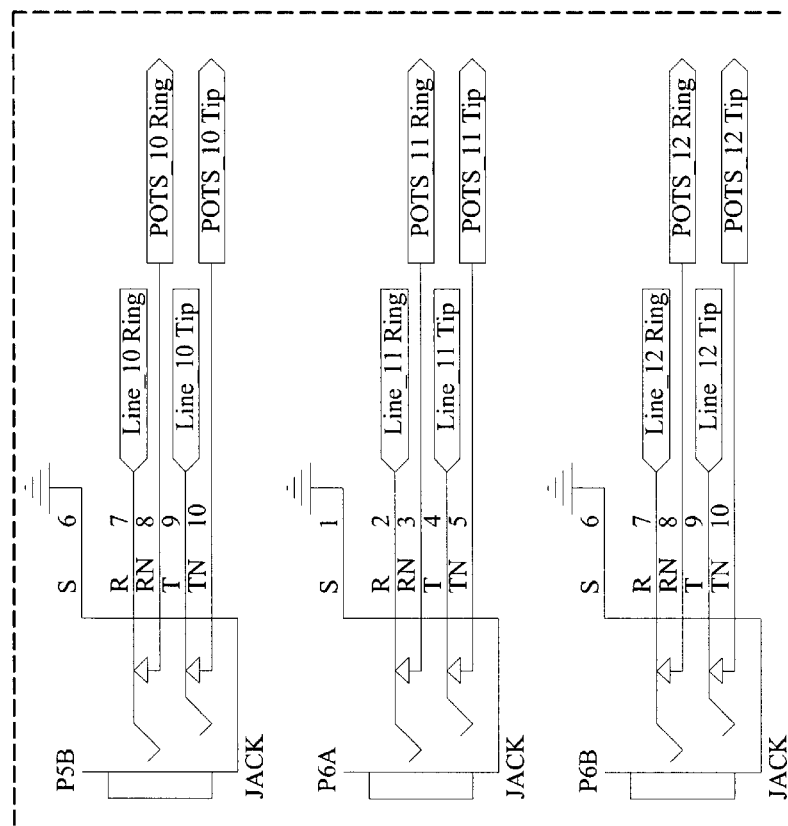
Figures 5, 6B:
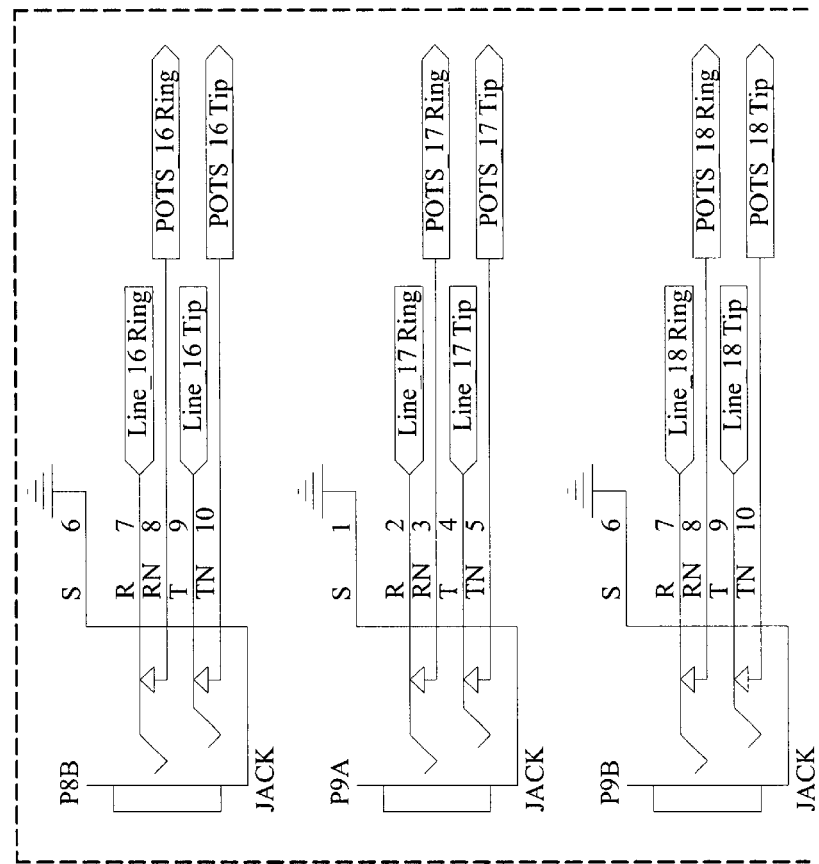
Figures 6, 6B:
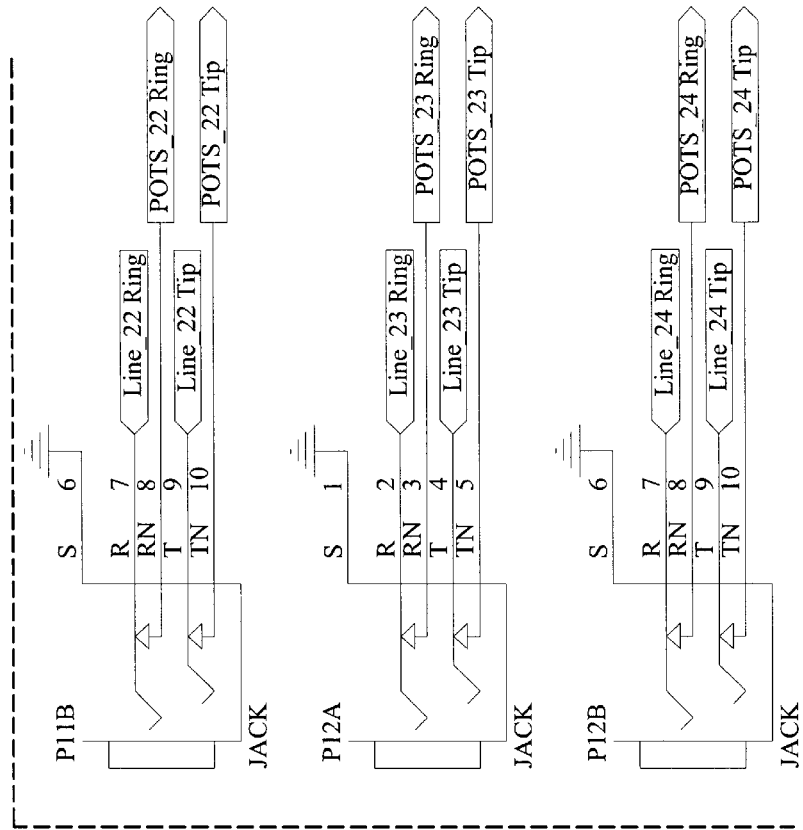

The conductors 26' are preferably electrically connected to the springs 82, 86 and contacts 84, 88 of the jacks 52 by tracings (i.e., lines of electrically conductive material) provided on the circuit board 72. An exemplary tracing schematic for the circuit board 72 is shown in FIGS. 6A and 6B. As shown in FIGS. 6A and 6B, each pair of conductors 26' of the IN connector 20' (i.e., the upper connector) is connected to a corresponding set of tip and ring springs 82 and 86. For example, the uppermost pair of conductors 26' (i.e., conductors labeled 1 and 26) of the IN connector 20' are connected to the uppermost set of tip and ring springs 82 and 86 by tracings 100 and 102. Similar tracings are provided for each of the pairs of conductors 26' of the IN conductor 20'. As also shown in FIGS. 6A and 6B, each pair of conductors 26' of the OUT connector 20' (i.e., the lower connector) is connected to a corresponding set of tip and ring normal contacts 84 and 88. For example, the uppermost pair of conductors 26' (i.e., conductors labeled 1 and 26) of the OUT connector 20' are connected to the uppermost set of tip and ring normal contacts 84 and 88 by tracings 104 and 106.

In use of the test box 23, twisted pair signals are input into the test box 23 through the IN connector 20'. From the IN-connector 20', the signals are conveyed by tracings to the tip and ring springs 82 and 86. With no plugs inserted within the ports 54 of the jacks 52, the jack circuits are closed such that signals travel from the tip and ring springs 82 and 86 to the tip and ring normal contacts 84 and 88. From the tip and ring normal contacts 84 and 88, the signals are conveyed to the OUT connector 20' where the signals are output from the test box 23.

If it is desired to test one of the signals, a tip-and-ring plug is inserted into the port corresponding to the signal. By inserting the plug into the port, the corresponding tip and ring springs 82 and 86 are disconnected from their respective tip and ring normal contacts 84 and 88 (i.e., the circuits are opened), and the signal is outputted through the plug to desired testing equipment.

Figure 7:
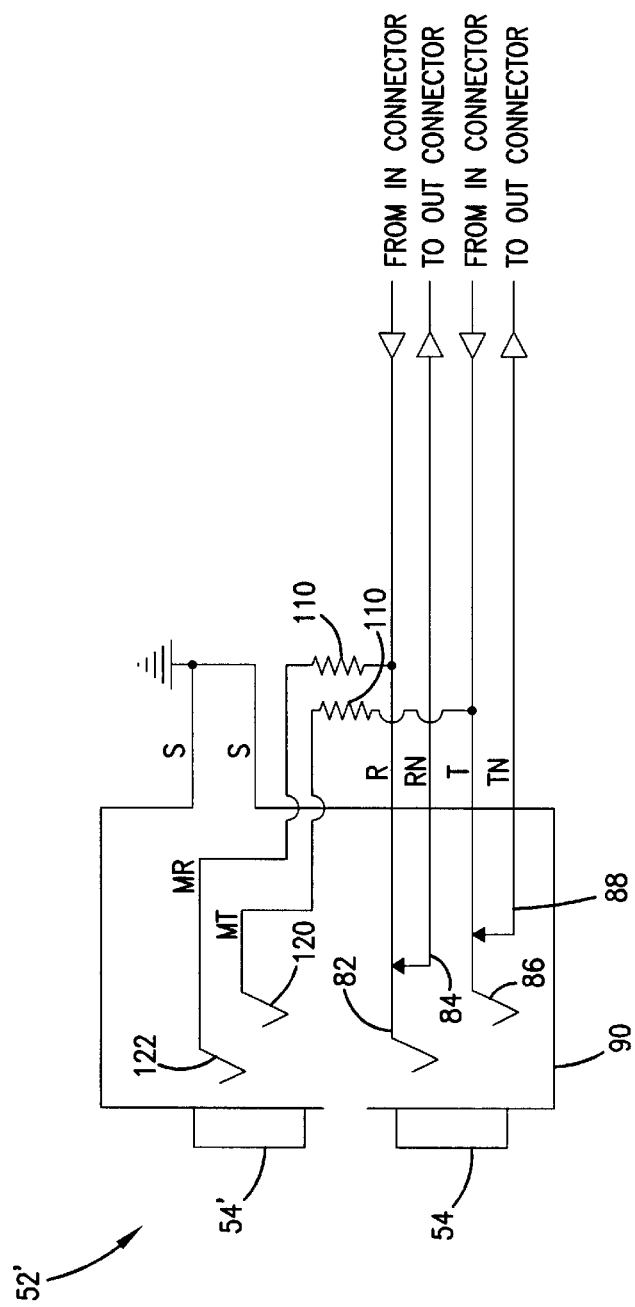
FIG. 7 is a schematic view of an alternative jack equipped with a monitor port.

The above-described testing technique can be intrusive in that the signal is typically disrupted for testing to be accomplished. In this regard, alternative jacks having monitor ports for non-intrusively testing signals could also be used as part of the present invention. For example, a jack 52' having a monitor port 54' as shown in FIG. 7 could be used. Tip and ring springs 120 and 122 correspond to port 54'. Resistor elements 110 limit the percentage of the signal that is split from the main lines thereby maintaining signal integrity within the main lines (e.g., less that 10% of the signal is output through the testing plug). By inserting a plug within a port such as monitor port 54', a signal passing through the test box 23 can be non-intrusively tested. The signal can also be fully diverted by inserting a plug in port 54.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A test box comprising:

a housing defining a front plane and a back plane;

a plurality of jacks positioned adjacent the front plane, the jacks defining a plurality of rows of ports, each row of ports including at least 24 ports, the jacks also including electrical contacts corresponding to each of the ports;

a plurality of pairs of electrical connectors positioned adjacent the back plane, each pair including an input connector for inputting signals into the test box and an output connector for outputting signals from the test box; and a plurality of circuit boards positioned within the housing, the circuit boards including tracings for conveying signals from the input connectors to the jacks and for returning the signals from the jacks back to the output connectors.

2. The test box of claim 1, wherein each circuit board corresponds to a single one of the rows of ports and a single pair of the electrical connectors.

3. The test box of claim 1, wherein the electrical contacts include tip and ring springs.

4. The test box of claim 3, further comprising tip normal contacts corresponding to the tip springs, and ring normal contacts corresponding to the ring springs.

5. The test box of claim 1, wherein at least one of the ports comprises a monitor port.

6. The test box of claim 1, further comprising:

ports for allowing mixed voice and data signals to connects to the test box;

first cables for passing signals between the test box and a main distribution frame;

second cables for passing signals between the test box and a device adapted to split mixed voice and data signals.

* * * * *